United States Patent
Li

(10) Patent No.: US 10,909,274 B2
(45) Date of Patent: Feb. 2, 2021

(54) SCREEN PROTECTION FILTER

(71) Applicant: Right Group Central Co., Ltd., New Taipei (TW)

(72) Inventor: Chuan-En Li, Yilan County (TW)

(73) Assignee: Right Group Central Co., Ltd., New Taipei (TW)

( * ) Notice: Subject to any disclaimer, the term of this patent is extended or adjusted under 35 U.S.C. 154(b) by 332 days.

(21) Appl. No.: 15/834,324

(22) Filed: Dec. 7, 2017

(65) Prior Publication Data

US 2018/0129829 A1 May 10, 2018

(30) Foreign Application Priority Data

Dec. 9, 2016 (CN) ...................... 2016 2 1349356 U

(51) Int. Cl.
*G02B 7/00* (2006.01)
*G06F 21/84* (2013.01)
*G02B 5/20* (2006.01)

(52) U.S. Cl.
CPC ............. *G06F 21/84* (2013.01); *G02B 5/203* (2013.01); *G02B 7/006* (2013.01); *G02B 2207/123* (2013.01)

(58) Field of Classification Search
CPC .... G06F 1/1609; G06F 1/1601; G06F 1/1607; G06F 21/84; G06F 21/6245; G06F 2200/1613; G02B 2207/123; G02B 5/203; G02B 7/006
See application file for complete search history.

(56) References Cited

U.S. PATENT DOCUMENTS

| 7,508,657 | B1 * | 3/2009 | Smith | G06F 1/1601 361/679.24 |
| 7,965,498 | B2 * | 6/2011 | Gotham | H05K 5/02 361/679.21 |
| 8,033,515 | B2 * | 10/2011 | Martin | G06F 1/1607 248/224.61 |
| 9,444,508 | B2 * | 9/2016 | Lee | H04M 1/0202 |
| 2007/0132910 | A1 * | 6/2007 | Liao | G02F 1/133308 349/58 |
| 2009/0027583 | A1 * | 1/2009 | McBroom | G06F 1/1601 349/58 |

(Continued)

FOREIGN PATENT DOCUMENTS

JP 2005003761 A * 1/2005
JP 3200365 U * 10/2015

*Primary Examiner* — Christopher Stanford
(74) *Attorney, Agent, or Firm* — Andrew M. Calderon; Roberts Calderon Safran & Cole, P.C.

(57) ABSTRACT

A screen protection filter includes a protection filter body and an attracting member. The protection filter body includes an attraction area and a protection area. The attracting member is disposed at the attraction area of the protection filter body. With the attracting member, the protection filter body is attachable to an attraction component of an electronic device, such that the protection area of the protection filter body correspondingly covers over a display screen of the electronic device to prevent nearby persons from spying display contents and keep privacy. By simply attaching the attracting member to the attraction component and removing therefrom, the screen protection filter can be easily attached to and removed from the display screen of the electronic device whenever needed.

11 Claims, 9 Drawing Sheets

(56) References Cited

U.S. PATENT DOCUMENTS

| | | | | |
|---|---|---|---|---|
| 2011/0182029 A1* | 7/2011 | Wu | ................ | G03B 11/041 |
| | | | | 361/679.55 |
| 2014/0118270 A1* | 5/2014 | Moses | ................ | G06F 3/041 |
| | | | | 345/173 |
| 2015/0009399 A1* | 1/2015 | Jonsson | ................ | G06F 1/1656 |
| | | | | 348/373 |

* cited by examiner

SCREEN PROTECTION FILTER

CROSS-REFERENCE TO RELATED APPLICATION

This non-provisional application claims priority under 35 U.S.C. § 119(a) to Patent Application No. 201621349356.7 filed in China on Dec. 9, 2016, the entire contents of which are hereby incorporated by reference.

BACKGROUND

Technical Field

The instant disclosure relates to a screen protection filter, and particularly relates to an attractive-type screen protection filter.

Related Art

With the advanced progresses of technologies and networks, mobile devices (such as smartphones, tablet computers, notebook computers, etc.) have become indispensable for daily human life. Since mobile devices are very convenient to carry with, people use mobile devices in the offices, in public facilities or on public transportation vehicles.

Generally, mobile devices available in the market mostly do not have the function of preventing the screen from spying. While using in public, nearby persons can easily see the contents displayed on the screen, so user privacy cannot be protected. Accordingly, one solution is to adhere a privacy sheet on the screen of the mobile device to prevent from being easily viewed. However, users find it difficult to remove the privacy sheet adhered on the screen, and the residual glue is even more troublesome. While using in private space, without the concerns of privacy protection temporarily, the privacy sheet adhered on the screen still cannot be easily removed. If the privacy sheet is kept adhered on the screen, it generally causes the brightness of the screen to be darker and the sharpness of the screen to be lower, which will harm the user's eyesight in the long term. Therefore, improvements are necessary.

SUMMARY

Based on the problem mentioned above, an embodiment of the instant disclosure provides a screen protection filter for attaching to attraction component(s) of an electronic device and correspondingly covering a display screen of the electronic device, thereby preventing from spying and keeping privacy.

In an embodiment, a screen protection filter is adapted to be attachable to an attraction component of an electronic device for attaching to a display screen of the electronic device. The screen protection filter includes a protection filter body and an attracting member. The protection filter body includes an attraction area and a protection area. The attracting member is disposed at the attraction area of the protection filter body. The protection filter body with the attracting member is attachable to the attraction component of the electronic device, with the protection area of the protection filter body correspondingly covering over the display screen of the electronic device.

In an embodiment, an accommodation hole is defined within the attraction area of the protection filter body, and the attracting member is positioned in the accommodation hole.

In an embodiment, the accommodation hole is a slot and the attracting member is circular, oval or bar-shaped, corresponding to the accommodation hole.

In an embodiment, the screen protection filter further includes a shield piece, wherein the shield piece is configured on the attraction area and covers an outer portion of the attracting member.

In an embodiment, a through hole is defined on the shield piece.

In an embodiment, plural accommodation holes are defined within the attraction area; the accommodation holes are defined with symmetry according to a center line of the protection filter body; and the attracting member includes plural attracting blocks positioned in the accommodation holes respectively.

In an embodiment, the attracting member is disposed on the surface of the attraction area.

In an embodiment, the attracting member includes plural attracting blocks, and the attracting blocks are disposed with symmetry according to a center line of the protection filter body.

In an embodiment, the protection filter body includes an outer surface layer and a grating layer, and the outer surface layer is overlapped onto a side of the grating layer.

In an embodiment, a pulling piece is extended from an edge of the protection filter body.

The various screen protection filter(s) disclosed in the following embodiments are provided with an attracting member disposed at an attraction area of a protection filter body. In the installing process, the attracting member may be simply aligned with attraction component(s) of an electronic device to rapidly attach the screen protection filter to the electronic device and cover a display screen thereof, thereby preventing nearby persons from spying display contents and keeping privacy. By simply attaching the attracting member to the attraction component and removing therefrom, the screen protection filter can be easily attached to and removed from the display screen of the electronic device whenever needed.

BRIEF DESCRIPTION OF THE DRAWINGS

The disclosure will become more fully understood from the detailed description given herein accompanying by the following figures, which are for illustration only, and thus not limitative of the disclosure, wherein.

DETAILED DESCRIPTION

The spirit and scope of the instant disclosure is further introduced by the way of example and in terms of the preferred embodiments as follows.

Figure 1:
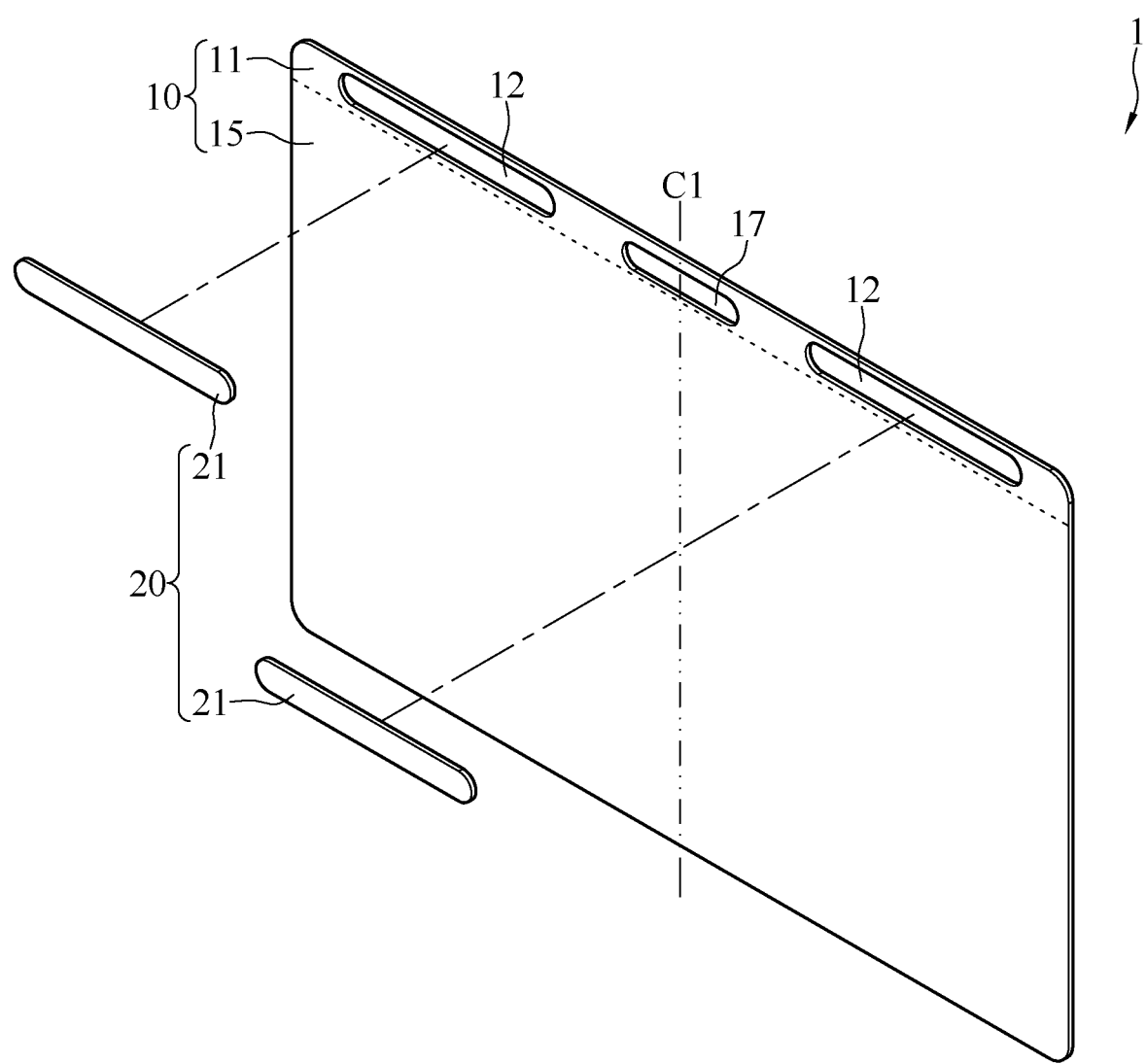
FIG. 1 is an exploded perspective view of a screen protection filter according to a first exemplary embodiment of the instant disclosure.

Please refer to FIG. 1, which illustrates an exploded perspective view of a screen protection filter according to a first exemplary embodiment of the instant disclosure. In the embodiment, a screen protection filter 1 includes a protection filter body 10 and an attracting member 20. The protection filter body 10 includes an attraction area 11 and a protection area 15, wherein the attraction area 11 is defined at a side of the protection filter body 10, and the protection area 15 includes the rest of the protection filter body 10 other than the attraction area 11. Accommodation hole(s) 12 are defined within the attraction area 11 of the protection filter body 10, and each accommodation hole 12 intercommunicates the two opposite surfaces of the protection filter body 10. The attracting member 20 includes attracting block(s) 21, and each attracting block 21 is positioned in the accommodation hole 12 by inserting or adhering the attracting block 21 inside the accommodation hole 12. In an embodiment, the surfaces of the attracting block 21 is preferably aligning with the surfaces of the protection filter body 10 to be more shipshape; however, the surfaces of the attracting block 21 may be adapted higher or lower than the surface of the protection filter body 10, which is not limited to the embodiment.

Figure 2:
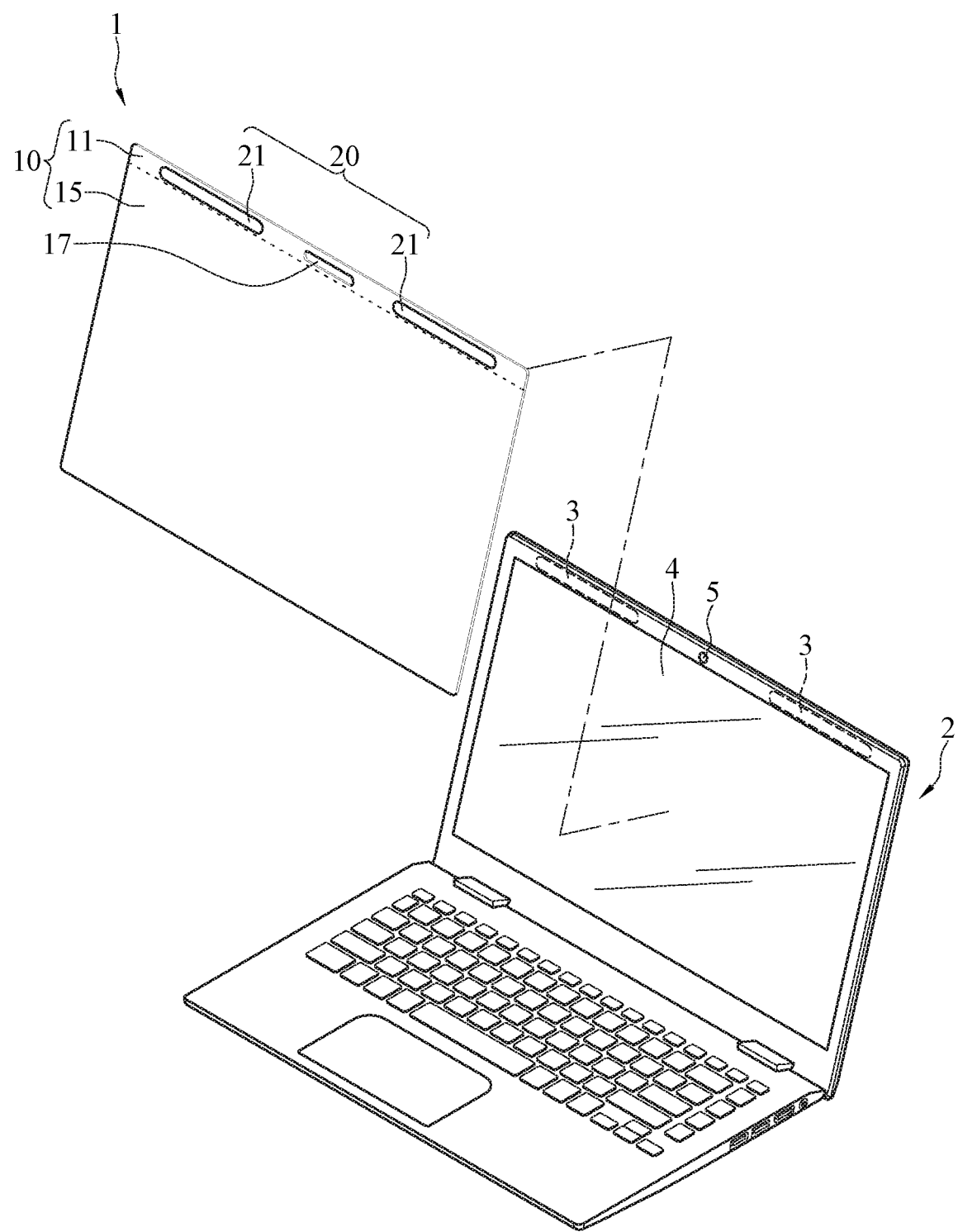
FIG. 2 is an exploded perspective view of a screen protection filter and an electronic device according to another exemplary embodiment of the instant disclosure.

Accordingly, as shown in FIG. 2, by disposing the attracting member 20 at the attraction area 11 of the protection filter body 10, the protection filter body 10 with the attracting member 20 is attachable correspondingly to the attraction components 3 of the electronic device 2. The attracting member 20 and the attraction component 3 may be both be magnets (for example Ferrite, alnico or rare-earth magnet) with different magnetic poles, or alternatively one of the attracting member 20 and the attraction component 3 may be a magnet and the other may be a ferromagnetic component (for example Fe, Ni, Co, or any metal components attractable to magnetic force), such that the attracting member 20 and the attraction component 3 may be attracted to each other. If the attracting member 20 and the attraction component 3 are magnets with different magnetic poles respectively, the attracting member 20 is attracted by the magnetic force to automatically align with the attraction component 3, thereby automatically positioning the screen protection filter 1 onto a correct position on the display screen 4 of the electronic device 2. In the embodiment, the electronic device 2 is a notebook computer, and the attraction components 3 are configured inside the notebook computer at the top portion of the display screen 4 for the attracting member 20 of the protection filter body 10 to correspondingly attach thereto. When the protection filter body 10 is moved with its attracting member 20 close to the attraction components 3, the magnetic force functions and make the attracting member 20 attach on the attraction components 3. The screen protection filter 1 is consequently positioned on the electronic device 2, with the protection area 15 of the protection filter body 10 correspondingly covering over the display screen 4 of the electronic device 2, thereby preventing nearby persons from spying privacy contents on the display screen 4. In addition, when the user has a need to remove the screen protection filter 1, the user needs only to remove the attracting member 20 from the attraction component of the electronic device 23, thereby achieving the advantages of rapidly attaching and removing. Furthermore, corresponding to a visual sensor 5 of the electronic device 2, an opening 17 is defined within the attraction area 11 of the protection filter body 10, thereby preventing the visual sensor 5 from being covered by the protection filter body 10 when the screen protection filter 1 is attached to the electronic device 2. Certainly, if necessary, other openings or holes may be defined on the protection filter body 10 to correspond to any other function components of the electronic device 2 (such as earphone jack(s) or functional button(s)).

Figure 5:
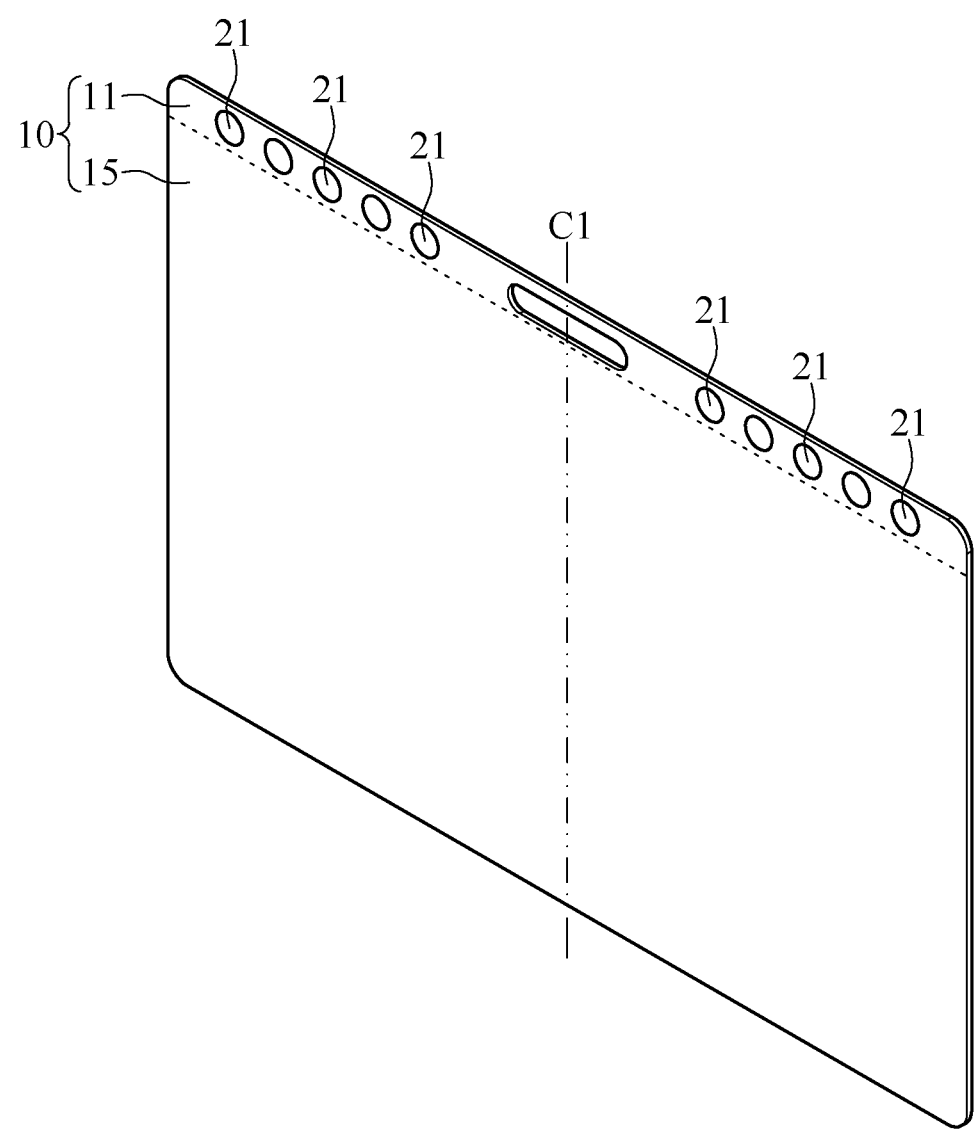
FIG. 5 is a perspective view of a screen protection filter according to a second exemplary embodiment of the instant disclosure.

Moreover, as shown in FIG. 1, in the embodiment, two accommodation holes 12 are defined within the attraction area 11 of the protection filter body 10. Each of the accommodation holes 12 is a slot. The accommodation holes 12 are defined with symmetry according to a center line C1 of the protection filter body 10. And each of the attracting blocks 21 may be long bar-shaped, corresponding to the shape of the accommodation hole 12, to have a greater attracting area. In addition, the attracting blocks 21 respectively positioned in each of the accommodation holes 12 are also positioned with symmetry according to the center line C1 of the protection filter body 10. Therefore, the attraction area 11 of the protection filter body 10 is able to averagely attach to the electronic device 2 and achieve better positioning. In some embodiments, the attraction area 11 of the protection filter body 10 may define only one accommodation hole 12, which is not a limitation to the embodiment. Besides, as shown in FIG. 5, which a perspective view of a screen protection filter according to a second exemplary embodiment of the instant disclosure, the difference between the embodiment and the first embodiment is that, multiple attracting blocks 21 (here each attracting blocks 21 is circular) are positioned at the attraction area 11 and at both sides of the center line C1 of the protection filter body 10, so as to have multiple attaching points and enhance the positioning effect.

Figure 3:
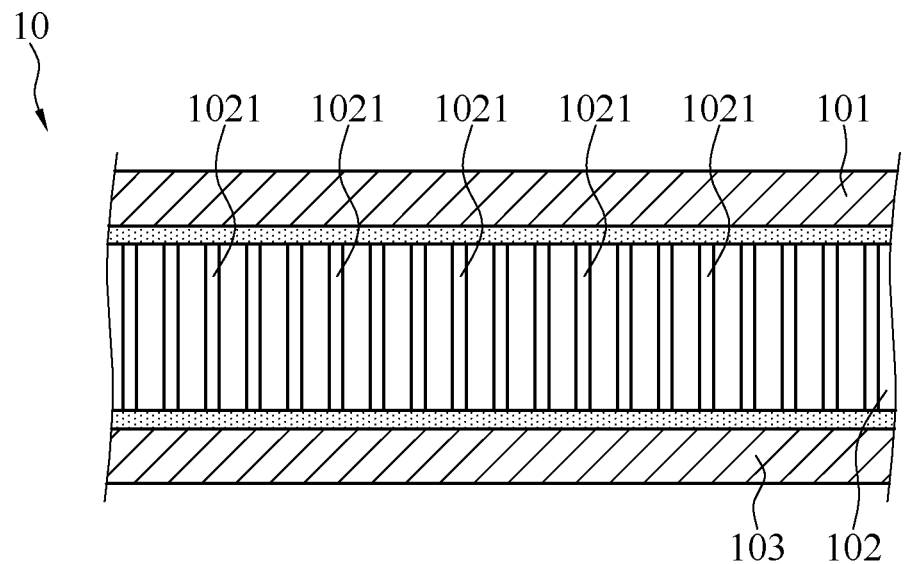
FIG. 3 is a sectional view of a protection filter body according to an exemplary embodiment of the instant disclosure.

Refer to FIG. 3, which is a sectional view of a protection filter body according to an exemplary embodiment of the instant disclosure. The protection filter body 10 includes two outer surface layers 101, 103 and a grating layer 102; however, the protection filter body 10 may include only one outer surface layer 101, which is not a limitation to the instant disclosure. The outer surface layers 101, 103 may be highly transparent resin layers. For example, the outer surface layers 101, 103 may be Polyimide, Polyethylene terephthalate, Polycarbonate or PET. The grating layer 102 is disposed between the two outer surface layers 101, 103. For example, the outer surface layers 101, 103 are respectively adhered onto two opposite surfaces of the grating layer 102.

Figure 4:
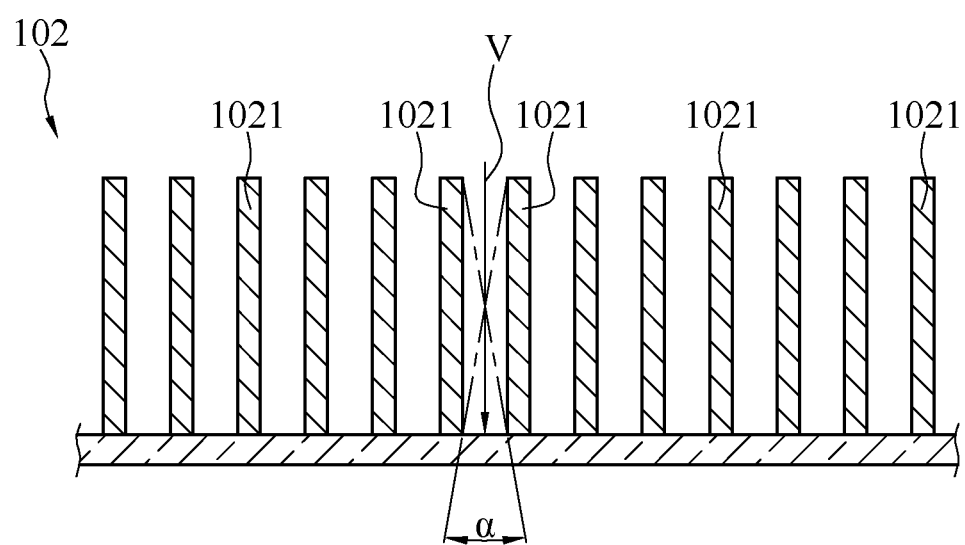
FIG. 4 is a sectional view of a grating layer according to an exemplary embodiment of the instant disclosure.

Refer to FIG. 4, which is a sectional view of a grating layer according to an exemplary embodiment of the instant disclosure. The grating layer 102 includes multiple opaque grating walls 1021 configured according to microlouver principle. The opaque grating walls 1021 of the grating layer 102 are configured in parallel with a constant interval (namely standing louver structures) to limit light passing within a certain angle α. Therefore, only a visual range within the angle α is provided; and the angle shown as Arrow V, vertical to the grating layer 102 (namely zero degree), can have unaffected visibility as most of light is not blocked. If the viewing angle differentiates more from the angle α, the brightness becomes lower, thereby sufficiently preventing nearby persons from spying and keeping privacy.

Figure 6:
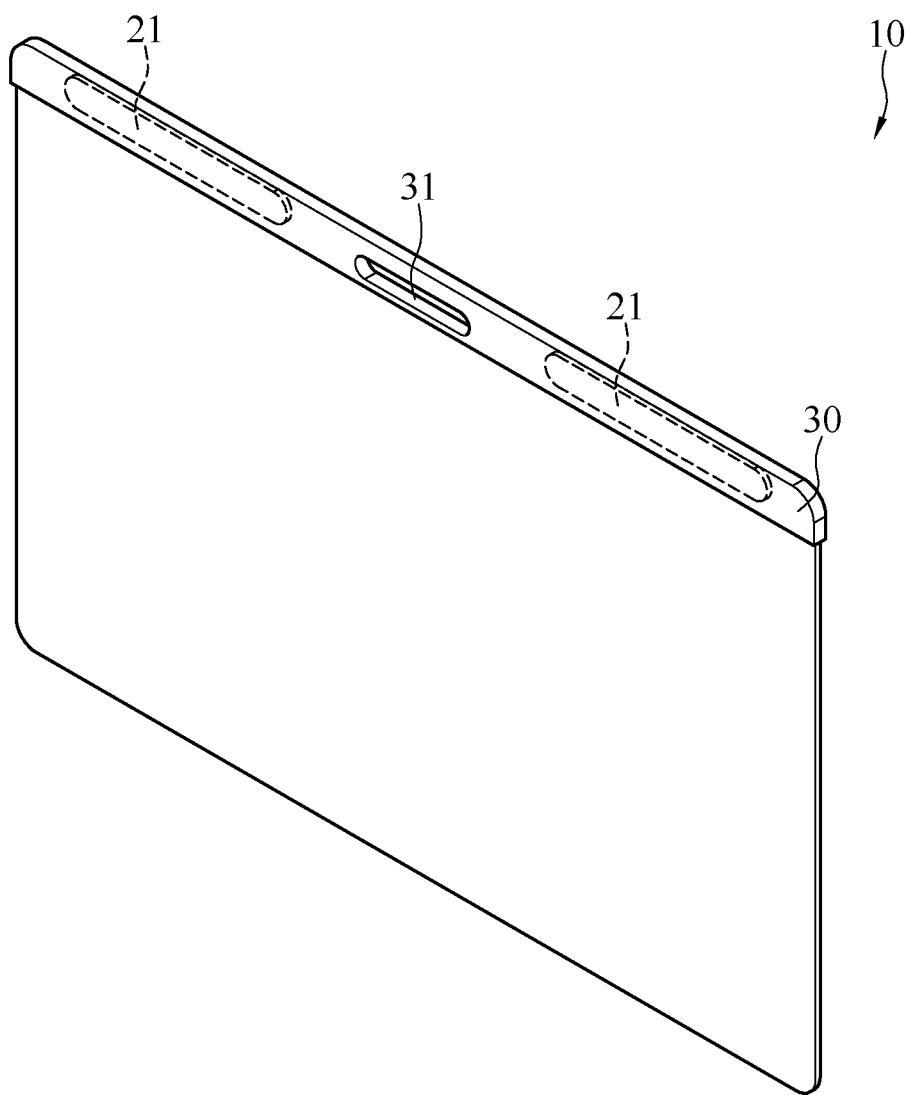
FIG. 6 is a perspective view of a screen protection filter according to a third exemplary embodiment of the instant disclosure.

Refer to FIG. 6, which is a perspective view of a screen protection filter according to a third exemplary embodiment of the instant disclosure. The major difference between the embodiment and the first embodiment is, the protection filter body 10 further includes a shield piece 30 configured at the attraction area 11. For example, the shield piece 30 may be formed by heat compression molding to cover over the attraction area 11, as well as covering over the outer portions of the attracting block(s) 21 and of the accommodation hole(s) 12, thereby protecting the attracting block(s) 21 and beautifying the appearance. The shield piece 30 may be a plastic piece made of PC, PMMA, PE, PVC or PET to achieve dirt-proof, water-repellent and abrasion-resistant effects; alternatively, the shield piece 30 may be a piece made of rubber, silicon, leather or cloth materials.

As shown in FIG. 6, in the embodiment, a second through hole 31 is further defined on the shield piece 30. Please jointly refer to FIG. 2, the second through hole 31 is defined corresponding to the opening 17 of the protection filter body 10 and the visual sensor 5 of the electronic device 2, so as to prevent the visual sensor 5 from being covered by the shield piece 30 when the screen protection filter 1 is attached onto the electronic device 2. In addition, when attaching the screen protection filter 1 to the electronic device 2, having the shield piece 30 configured can provide buffering effect therebetween. In some embodiments, other openings or holes may be further defined on the shield piece 30 to correspond to other functional components of electronic device 2 (such as earphone jack(s) or functional button(s)), which are omitted in the drawing.

Figure 7:
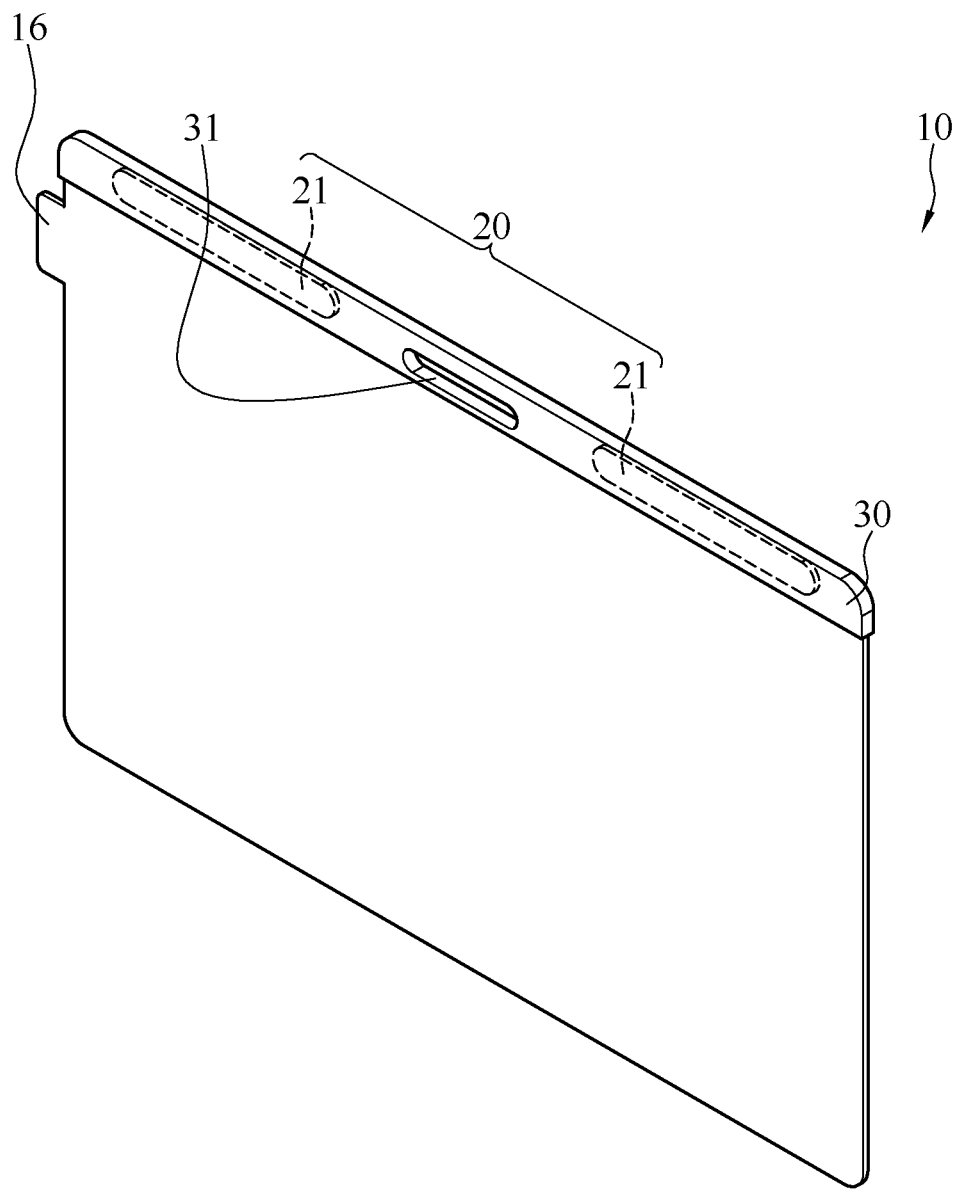
FIG. 7 is a perspective view of a screen protection filter according to a fourth exemplary embodiment of the instant disclosure.

Refer to FIG. 7, which is a perspective view of a screen protection filter according to a fourth exemplary embodiment of the instant disclosure. The major difference between the embodiment and the third embodiment is, that a pulling piece 16 is extended at an edge of the protection filter body 10, so that after the screen protection filter 1 is attached to the electronic device 2, the pulling piece 16 is exposed outer than a side of the electronic device 2. When the user has the need to remove the screen protection filter 1, the pulling piece 16 may be held by the user and applied with outward force to remove the screen protection filter 1 from the electronic device 2. Additionally, the pulling piece 16 and the protection filter body 10 in some embodiments may be formed in one piece to achieve better structural strength and faster manufacturing art.

Figure 8:
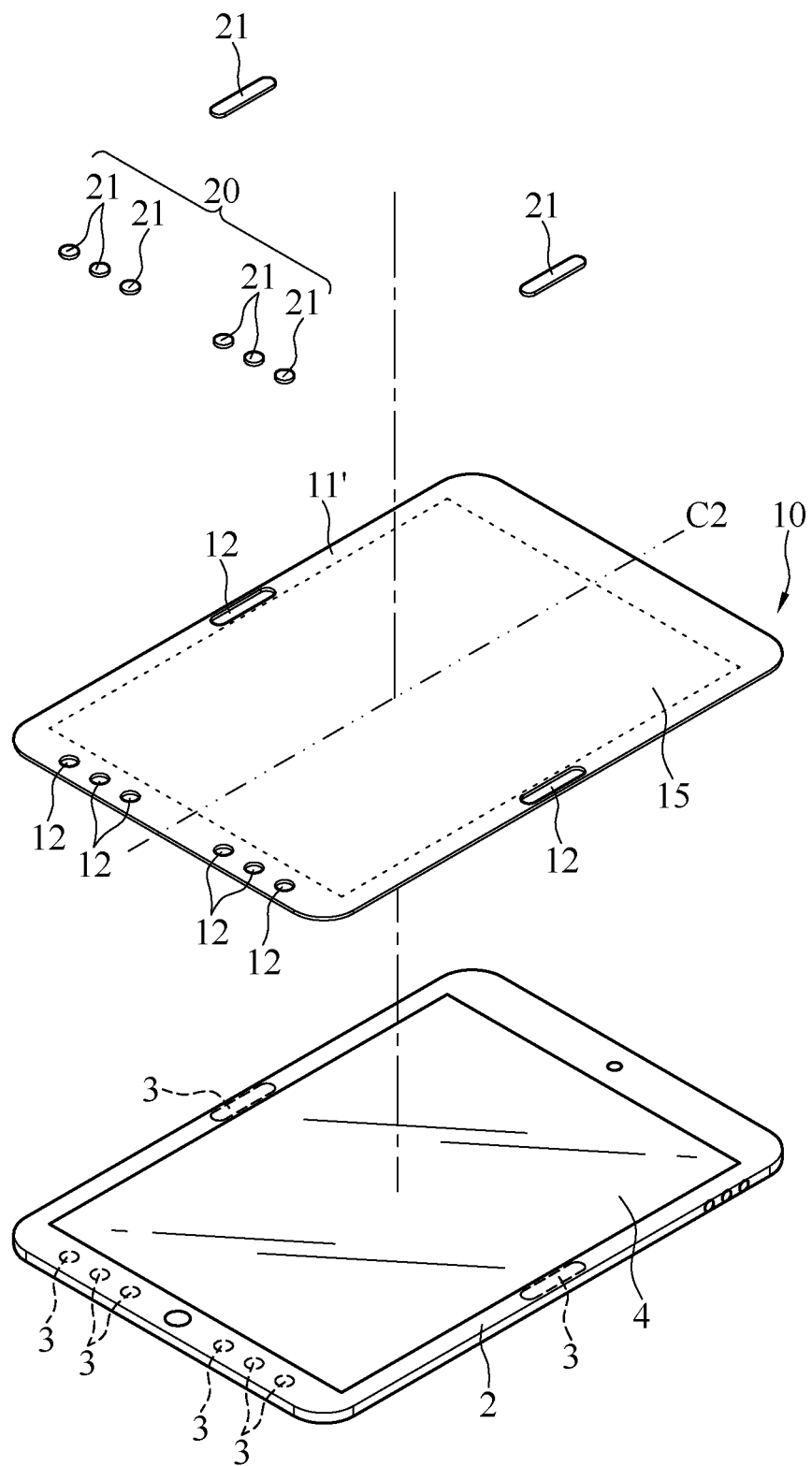
FIG. 8 is a perspective view of a screen protection filter according to a fifth exemplary embodiment of the instant disclosure.

Refer to FIG. 8, which is a perspective view of a screen protection filter according to a fifth exemplary embodiment of the instant disclosure. In the embodiment, the electronic device 2 is a tablet computer, and the attraction area 11' of the screen protection filter 1 is defined along the peripheral of the protection filter body 10. The accommodation holes 12 are defined at three sides of the protection filter body 10, and each of the accommodation holes 12 has a attracting block 21 positioned therein, corresponding to the attraction components 3 configured inside the electronic device 2. Preferably, these accommodation holes 12 and attracting blocks 21 are defined with symmetry according to a center line C2 of the protection filter body 10 to achieve better attaching effect. In another embodiment, the accommodation hole 12 and the attracting block 21 positioned therein may be defined around the entire peripheral of the protection filter body 10, namely four sides of the protection filter body 10 are capable of attaching to the attraction component 3 of the electronic device 2.

Figure 9:
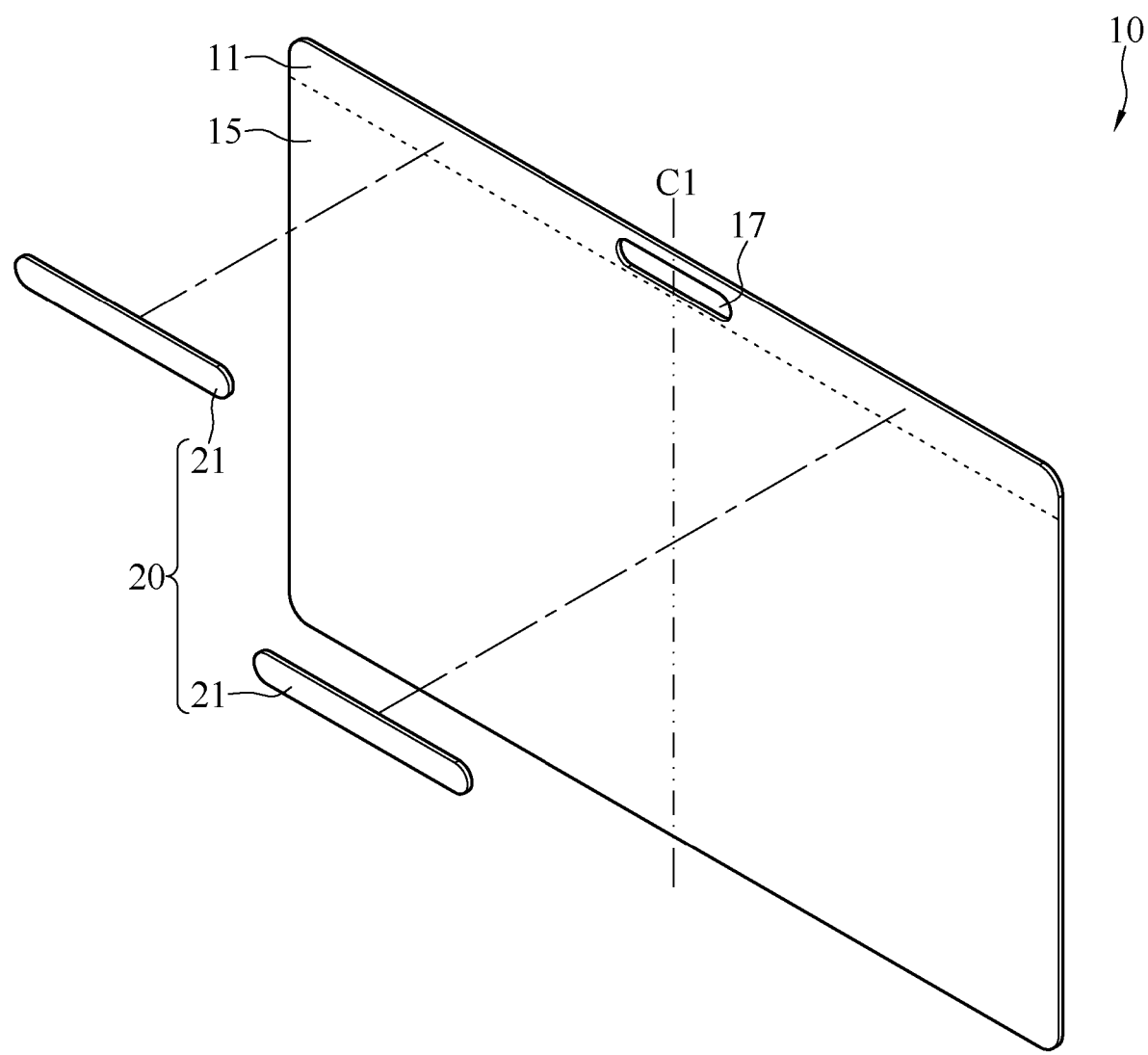
FIG. 9 is a perspective view of a screen protection filter according to a sixth exemplary embodiment of the instant disclosure.
Figure 10:
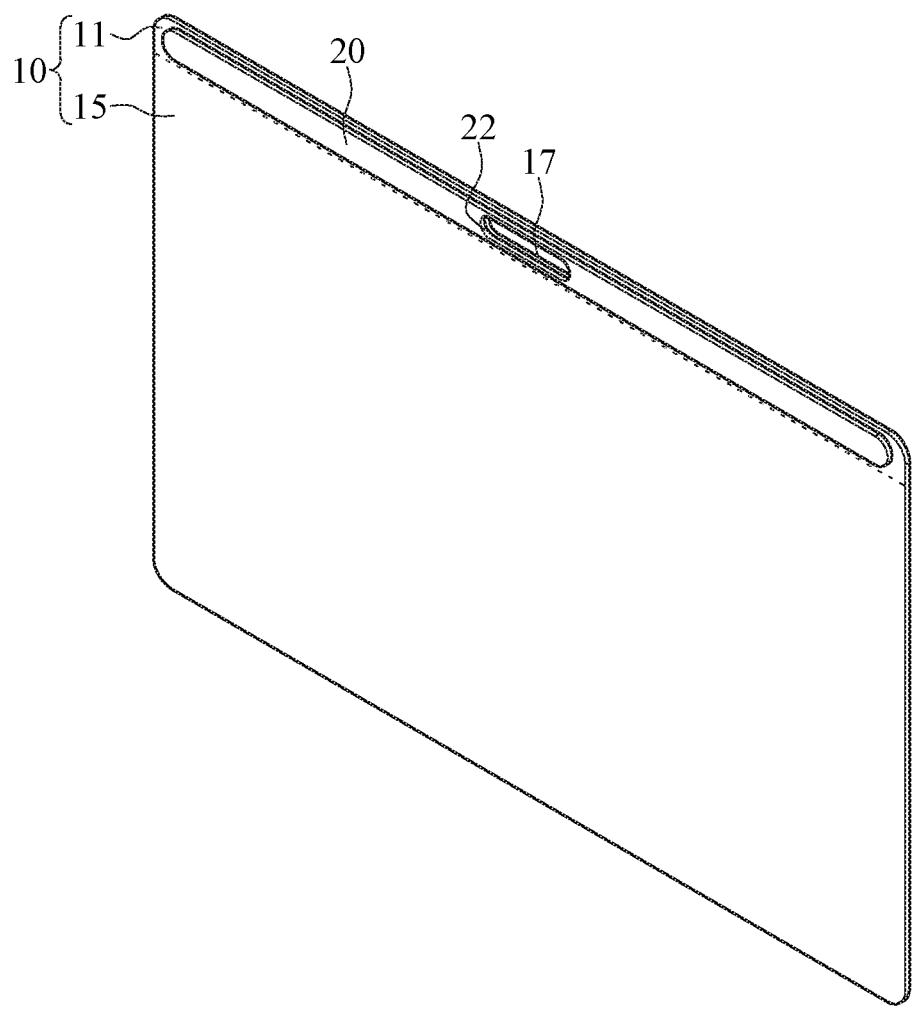
FIG. 10 is a perspective view of a screen protection filter according to a seventh exemplary embodiment of the instant disclosure.

Refer to FIG. 9, which is a perspective view of a screen protection filter according to a sixth exemplary embodiment of the instant disclosure. In the embodiment, the accommodation hole 12 is omitted on the screen protection filter 1, and the attracting member 20 is disposed directly on the surface of the attraction area 11 of the protection filter body 10. For example, the attracting member 20 may be positioned on the surface of the attraction area 11 by adhering or heat compression. In another embodiment, the attracting member 20 includes multiple attracting blocks 21, which are disposed with symmetry according to the center line C1 of the protection filter body 10. Alternatively, as shown in FIG. 10, the attracting member 20 may be a single, long bar-shaped attracting block and cover most of the surface of the attraction area 11. In an embodiment the attracting member 20 has a first through hole 22 and the first through hole 22 is corresponding to the opening 17. In another embodiment, the attracting member 20 may have exactly the same shape and size as the attraction area 11, covering over the entire surface of the attraction area 11, while the outer portion of the attracting member 20 may also be covered by the shield piece 30 shown in FIG. 6. In different embodiments, the shield piece 30 is configured on one or two surfaces of the attraction area 11, and on one or two surfaces of the outer portion of the attracting member 20 (as well as of the attracting block(s) 21 and of accommodation hole(s) 12). In addition, the shield piece 30 may cover over the entire peripheral attraction area 11, or only some sides of the peripheral attraction area 11. Refer to FIG. 2, FIG. 5, FIG. 8, and FIG. 10 in an embodiment, the attracting member 21 is circular, oval or bar-shaped.

Accordingly, the above-mentioned embodiments disclose various screen protection filter(s) provided with an attracting member disposed at an attraction area of its protection filter body. In the installing process, the attracting member may be simply aligned with attraction component(s) of an electronic device to rapidly attach the screen protection filter to the electronic device and cover a display screen thereof, thereby preventing nearby persons from spying display contents and keeping privacy. By simply attaching the attracting member to the attraction component and removing therefrom, the screen protection filter can be easily attached to and removed from the display screen of the electronic device whenever needed.

While the disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A screen protection filter, adapted to be attachable to an electronic device, wherein the electronic device comprises a display screen, an attraction component, and a functional component, the screen protection filter comprises:
   a protection filter body, having an attraction area, an opening, and a protection area, wherein the attraction area extends from a first corner of the protection filter body to a second corner of the protection filter body along an edge of the protection filter body, the opening is formed at the attraction area and the opening corresponds to the functional component of the electronic device; and the protection area correspondingly covers over the display screen of the electronic device;
an attracting member, having a first through hole, wherein the attracting member is disposed at the attraction area of the protection filter body, and the attracting member is attachable to the attraction component of the electronic device; the first through hole corresponds to the opening; and
a shield piece, having a second through hole, wherein the shield piece is disposed on the attracting member to cover the attracting member, and the shield piece is disposed on the attraction area to cover the attraction area; the second through hole corresponds to the opening.

2. The screen protection filter according to claim 1, wherein the attracting member comprises a plurality of attracting blocks, the attracting blocks are disposed symmetrically with respect to a center line of the protection filter body.

3. The screen protection filter according to claim 1, wherein the protection filter body comprises an outer surface layer and a grating layer, and the outer surface layer is overlapped onto a side of the grating layer.

4. The screen protection filter according to claim 1, wherein a pulling piece is extended from another edge of the protection filter body.

5. The screen protection filter according to claim 1, wherein the attracting member is circular, oval or bar-shaped.

6. A screen protection filter, adapted to be attachable to an electronic device, wherein the electronic device comprises a display screen, an attraction component, and a functional component, the screen protection filter comprises:
a protection filter body, having an attraction area, an opening, and a protection area, wherein the attraction area extends from a first corner of the protection filter body to a second corner of the protection filter body along an edge of the protection filter body; the opening is formed at the attraction area and the opening corresponds to the functional component of the electronic device; the protection area correspondingly covers over the display screen of the electronic device;
at least two attracting members, wherein the at least two attracting members are disposed at the attraction area of the protection filter body, and the at least two attracting members are attachable to the attraction component of the electronic device; and
a shield piece, having a through hole, wherein the shield piece is disposed on each of the at least two attracting members to cover the at least two attracting members, and the shield piece is disposed on the attraction area to cover the attraction area; the through hole corresponds to the opening.

7. The screen protection filter according to claim 6, wherein each of the at least two attracting members are circular, oval or bar-shaped.

8. The screen protection filter according to claim 6, wherein the at least two attracting members are disposed symmetrically with respect to a center line of the protection filter body.

9. The screen protection filter according to claim 6, wherein each of the at least two attracting members comprise a plurality of attracting blocks.

10. The screen protection filter according to claim 6, wherein the protection filter body comprises an outer surface layer and a grating layer, and the outer surface layer is overlapped onto a side of the grating layer.

11. The screen protection filter according to claim 6, wherein a pulling piece is extended from another edge of the protection filter body.

* * * * *